(No Model.)

G. W. HART.
FACE PLATE FOR FLUSH SWITCHES.

No. 592,249. Patented Oct. 26, 1897.

WITNESSES:
Frank S. Ober
J. S. Oswald.

INVENTOR
Gerald W. Hart,
BY
H. B. Brownell
his ATTORNEY

UNITED STATES PATENT OFFICE.

GERALD W. HART, OF HARTFORD, CONNECTICUT.

FACE-PLATE FOR FLUSH SWITCHES.

SPECIFICATION forming part of Letters Patent No. 592,249, dated October 26, 1897.

Application filed November 5, 1896. Serial No. 611,128. (No model.)

*To all whom it may concern:*

Be it known that I, GERALD W. HART, a citizen of the United States, residing in Hartford, county of Hartford, and State of Connecticut, have invented a certain new and useful Face-Plate for Flush Switches, of which the following is a full, clear, and exact specification.

My invention relates to face-plates having a central depression, and the method of making the same, and has for its object to produce a finished and perfect article in a new and advantageous manner.

The following is a description of my plate, reference being had to the accompanying drawings, in which—

Figure 1:
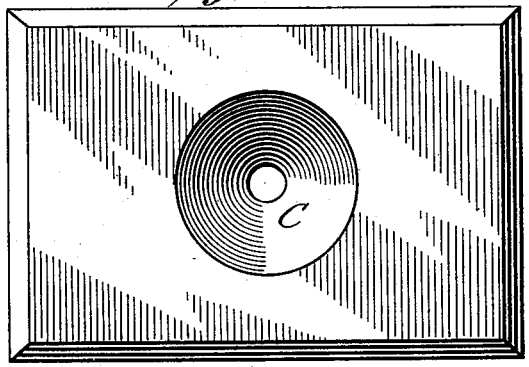
Figure 2:
Figure 3:
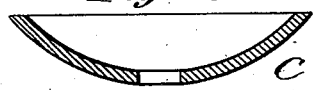
Figure 4:
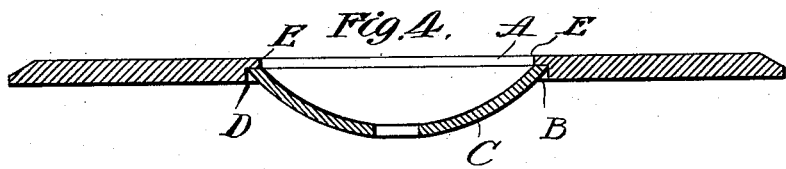
Figure 5:

Figure 1 is a plan view of my plate. Figs. 2, 3, and 4 are sectional views of the two parts of the same at various stages of its manufacture, and Fig. 5 represents a section of the plate shown in Fig. 1.

In carrying out my invention I take a piece of metal, preferably rolled brass, for the body portion of the plate and cut from its center a round hole A a trifle smaller than the diameter of the desired depression at the surface of the finished plate. On the rear of this body portion, around this hole A, I then form, preferably by cutting, a groove or recess, forming a circle B, having the center of the hole A as its center. I then take a cup-shaped piece of metal, such as C, preferably stamped out of rolled brass and thinner than that of the body portion and shaped so as to have substantially the desired curvature of the depression and be of a diameter equal to the diameter of the circumference of the groove B. This cupped piece C is then placed in position as shown in Fig. 4, and the edge D of the groove B is spun over onto its rear surface, as shown in Fig. 5 at D'. The cupped piece C is thus securely held in position. The edge E of Fig. 4 is then worked down so that the metal of the plate A is directly in continuation of that of the cupped piece C, as shown at E' in Fig. 5, producing a smooth and finished surface. The product can then be plated or otherwise finished, as desired. The plate as thus constructed can be made of two thicknesses of metal. The cup is firmly held in position in the groove B by the spun edge D', and the faces of the parts can easily be worked down so as to produce as fine a result as though the plate were cut out of one solid piece of cold-rolled brass, a result that cannot, so far as I know, be otherwise accomplished, since if formed by stamping from a single sheet the metal has to be too thin to have the necessary body, and if cast the metal will not be sufficiently uniform to take a fine finish.

I have above described the plate construction preferred by me. I do not intend to limit myself to the particular construction or method described and shown, as plates embodying my invention can be made in other ways.

What I claim is—

1. A new article of manufacture being, a face-plate for electric switches and the like, said article comprising a body portion having an orifice therein, the edge of said body portion adjacent to said orifice being recessed, an independently-formed cupped-shaped blank corresponding substantially in shape, but of greater dimensions, than said orifice, said blank being seated in said recess, the metal of the body portion adjacent said recess engaging and retaining said cupped-shaped blank.

2. A new article of manufacture being, a face-plate for electric switches and the like, said article comprising a body portion having an orifice therein, the edge of said body portion adjacent to said orifice being recessed, an independently-formed cupped-shaped blank corresponding substantially in shape, but of greater dimensions, than said orifice, said blank substantially fitting the recess in the body portion, the metal of the body portion adjacent said recess being upset and engaging and retaining said cupped-shaped blank.

3. A new article of manufacture being, a face-plate for electric switches and the like, said article comprising a body portion having an orifice therein, the rear edge of said body portion adjacent said orifice being recessed, an independently-formed cupped-shaped blank corresponding substantially in shape, but of greater dimensions, than said orifice, the edge of said blank fitting said recessed portion, the external wall of said recess being upset and engaging and retaining said cupped-shaped blank, substantially as described.

GERALD W. HART.

Witnesses:
A. H. PEASE,
A. J. CORNWALL.